United States Patent Office 2,866,693
Patented Dec. 30, 1958

2,866,693

DIESEL FUEL

Joseph C. Allen, Bellaire, Tex., assignor to The Texas Company, New York, N. Y., a corporation of Delaware No Drawing. Application June 6, 1955
Serial No. 513,613

2 Claims. (Cl. 44—52)

This invention relates to a novel diesel fuel. More particularly, this invention relates to a diesel fuel in which a limited amount of a saturated liquefied hydrocarbon gas is blended.

Liquefied hydrocarbon gases are often found in excess in the petroleum industry and this occurrence creates a problem with respect to disposition of large amounts of these substances without wasting natural resources. Butane in particular and liquefied petroleum gases rich in butane are substances which at times, for example in the summer months, are found in overabundant amounts.

In modern diesel engines, air is admitted into the cylinder at the beginning of the compression stroke. As the admitted air is compressed by the piston, liquid fuel is injected into the combustion chamber. The fuel, prior to injection, is compressed to pressures ranging from 6000 to 25,000 p. s. i. and then sprayed into the combustion chamber through small orifices where it mixes with the compressed air. The time during which mixing can take place is extremely short, therefore, this fuel injection procedure is necessary to cause rapid dispersion of the fuel within the cylinder and resulting in better mixing of fuel and air. However, complete mixing still does not occur as evidenced by superfluous amounts of smoky exhaust issuing from modern diesel engines. Many attempts have been made to increase mixing of fuel and air including supplying excess air, varying combustion chamber design and creating turbulence in the air entering the cylinder since the efficiency of the engine varies directly with the extent of dispersion of the fuel in the cylinder.

I have found that the blending of liquefied butane, propane and mixtures thereof in a diesel fuel in an amount sufficient to raise the critical pressure, i. e. the pressure necessary to liquefy a gas at the critical temperature, to at least the compression pressure of the engine produces a fuel which affords improved combustion and engine efficiency. Much preferred as a blending component for the fuel is butane, or a liquefied petroleum gas consisting essentially of butane, owing to the fact that its volatility is favorable and it exists in abundance. However, propane, and mixtures essentially consisting of liquefied propane and butane, also form superior diesel fuel when blended therein in the specified amounts.

The term "phase envelope" defines the pressure and temperature limits within which a substance or mixture of substances exists in both the liquid and gas phases simultaneously. Outside the phase envelope the substance is either in the liquid phase or in the gaseous phase.

By using a fuel which quickly vaporizes on injection into the cylinder, a more complete dispersion and better mixing of the fuel and air prior to combustion will occur with the resulting increased power and efficiency. The phase envelope of an ordinary diesel fuel is rather small and does not include the pressure and temperature existing in the engine at the time of injection. However, by the addition of limited amounts of butane, propane or mixtures thereof, in the liquid phase, to the fuel, the boundaries of the phase envelope within which the fuel exists in two phases are increased so that pressures and temperatures normally existing in the cylinder of a diesel engine prior to ignition are included therein. The fuel containing propane, butane or mixtures thereof, is substantially vaporized early in the cycle prior to combustion with the result that excellent mixing of fuel and air is realized.

It is known that for small concentrations of a light hydrocarbon in a heavy hydrocarbon the phase envelope, or the limits of the conditions under which the mixture will exist in two phases, will be of such a nature that the cricondenbar (the maximum pressure at which a two-phase system can exist) will invariably be at a higher pressure than the critical pressure. Therefore, if a mixture is selected wherein the critical pressure is at least equal to the compression pressure of the engine, it is assured that the fuel mixture will vaporize early in the cycle after injection and prior to combustion.

Fuels which can be advantageously utilized in the present invention are hydrocarbon fractions heavier than gasoline usually employed as fuels for compression ignition engines, ordinarily having an initial boiling point in the upper part of the kerosene boiling range and an end boiling point in the residual fuel oil range, or boiling from 350° F. and up. The heavier fractions can be used owing to the viscosity reducing effect of the light hydrocarbons to be added in accordance with this invention.

Compression conditions normally encountered in modern diesel engines range from about 400 p. s. i. and up with temperatures up to 1000° F. prior to ignition. The high compression pressures are found in supercharged diesels. A minimum of about 4 volume percent of propane and about 6 volume percent of butane is effective in the diesel fuel at minimum compression pressures. The effective minimum addition amounts of mixtures of butane and propane or liquefied petroleum gases consisting essentially of butane and propane depends on the percentage composition of the addition, however, it would range between the effective additive amount of propane (4 volume percent) and butane (6 volume percent). It should be realized that in diesels employing increased compression pressure, the amount of liquefied hydrocarbon gas necessary to raise the value of the critical pressure to at least the compression pressure of the engine is necessarily increased. At compression pressure conditions of 700 p. s. i., for instance, about 17 percent propane and about 28 percent butane would be needed whereas the amount needed in a mixture of a gas comprising mainly butane and propane ranges between 17 volume percent and 28 volume percent depending on the percentage composition of the mixture. Therefore, without undue limitations, the effective amounts of propane, butane and mixtures thereof in a diesel fuel range from about 4 to 28 percent by volume in accordance with the present invention. Higher percentage blends are not as effective and are much too volatile.

Previously it had been thought that the inclusion of low boiling material would interfere with the spray penetration of the injected fuel and thus lower combustion efficiency. The fuel when injected into the cylinder in extremely small droplets must penetrate a dense air compressed above 400 p. s. i. which is extremely difficult. The fuel is injected at high velocities in order to overcome the resistance of the air and obtain more complete mixing. It is theorized that a point is reached where the size of the droplet and the injection pressure make the penetration and dispersal less because the size of the globules is so small that momentum is too soon overcome.

It had also been thought that the inclusion of a light hydrocarbon or mixtures thereof in a diesel fuel would cut down on engine efficiency since the weight of the fuel is continuously lowered as the amount of light hydrocarbon in the fuel increases. The weight of a fuel is normally indicative of the amount of potential energy available.

Both the above theories are overcome to the extent that I have found that the addition of propane, butane and mixtures thereof in limited quantities afford a fuel superior to a straight diesel fuel, and said fuel is particularly useful in raising the efficiency of lower compression ratio diesel engines although useful in all types of compression ignition engines. It is to be noted that in the use of diesel fuel blends according to this invention, the maximum power output is obtained at a later setting of injection timing from that optimum setting for the base fuel.

The following examples are given to demonstrate the advantages of the present invention.

EXAMPLE 1

A diesel fuel having an IBP of 410 and an EBP 621, a cetane number of 55.6 and an API gravity of 38.3 marketed by The Texas Company under the trademark "445 Diesel Chief" is blended with various percentage volumes of propane and tested in engines having various compression pressures and having speed and load kept constant.

The following table demonstrates the effectiveness of certain blends in a diesel engine having a compression ratio of 12.2, a compression pressure of 400 and a rated output of 80 p. s. i. BMEP at 1580 ft./min. mean piston speed.

Table 1

| Vol. Percent Propane | BMEP (p. s. i.) | BSFC (lbs./ B. H. P. hrs.) |
|---|---|---|
| 0 | 80 | .432 |
| *2 | 80 | .438 |
| 4 | 83 | .430 |
| 6 | 83 | .430 |
| 8 | 85 | .430 |

The following table demonstrates the effectiveness of the blends in a diesel engine having a compression ratio of 17, a compression pressure of 550 and a rated output of 80 p. s. i. BMEP at a mean piston speed of 1500 ft./min.

Table 2

| Vol. Percent Propane | BMEP (p. s. i.) | BSFC (lbs./ B. H. P. hrs.) |
|---|---|---|
| 0 | 80 | .441 |
| *4 | 80 | .446 |
| 8 | 81 | .436 |
| 10 | 83 | .440 |
| 12 | 85 | .440 |

The following table demonstrates the effectiveness of the blend in a diesel engine having a compression ratio of 22, a compression pressure of 700 and a rated output of 70 p. s. i. BMEP at a mean piston speed of 1500 ft./min.

Table 3

| Vol. Percent Propane | BMEP (p. s. i.) | BSFC (lbs./ B. H. P. hrs.) |
|---|---|---|
| 0 | 70 | .477 |
| *6 | 70 | .479 |
| 12 | 72 | .470 |
| 15 | 73 | .472 |
| 17 | 73 | .470 |

EXAMPLE 2

A diesel fuel as characterized in Example 1 is blended with various percentage volumes of butane and is tested in engines having various compression pressures and having the speed and load kept constant.

The following table demonstrates the effectiveness of the blends in a diesel engine as described in Table 1.

Table 4

| Vol. Percent Butane | BMEP (p. s. i.) | BSFC (lbs./ B. H. P. hrs.) |
|---|---|---|
| 0 | 80 | .431 |
| *4 | 79 | .431 |
| 6 | 83 | .425 |
| 10 | 86 | .425 |
| 12 | 86 | .423 |

The following table demonstrates the effectiveness of the blends in a diesel as described in Table 2.

Table 5

| Vol. Percent Butane | BMEP (p. s. i.) | BSFC (lbs./ B. H. P. hrs.) |
|---|---|---|
| 0 | 80 | .443 |
| *8 | 80 | .446 |
| 12 | 83 | .439 |
| 16 | 87 | .440 |
| 20 | 84 | .440 |

The following table shows the effectiveness of butane blends in an engine of the type described in Table 3.

Table 6

| Vol. Percent Butane | BMEP (p. s. i.) | BSFC (lbs./ B. H. P. hrs.) |
|---|---|---|
| 0 | 70 | .478 |
| *10 | 70 | .481 |
| 20 | 71 | .470 |
| 24 | 73 | .476 |
| 28 | 72 | .474 |
| 30 | 70 | .476 |

EXAMPLE 3

A diesel fuel as characterized in Example 1 is blended with various percentage volumes of mixtures of butane and propane in varying proportions and is tested in engines having various compression pressures with the load and speed kept constant.

The following table shows the effectiveness of blends in an engine as described in Table 1.

Table 7

| | BMEP (p. s. i.) | BSFC (lbs./ B. H. P. hrs.) |
|---|---|---|
| Vol. Percent of 50-50 Propane Butane Mixture: | | |
| 0 | 80 | .434 |
| 5 | 81 | .433 |
| 10 | 84 | .430 |
| Vol. Percent 25 parts Propane-75 parts Butane Mixture: | | |
| *4 | 80 | .438 |
| 6 | 83 | .430 |

The following table demonstrates the effectiveness of blends in an engine as described in Table 2.

Table 8

| | BMEP (p.s.i.) | BSFC (lbs./B.H.P. hrs.) |
|---|---|---|
| Vol. Percent 75 parts Propane–25 parts Butane Mixture: | | |
| 0 | 80 | .441 |
| 10 | 83 | .440 |
| 15 | 85 | .440 |
| Vol. Percent 50–50 Propane Butane Mixture: | | |
| 15 | 86 | .440 |
| 20 | 84 | .439 |

The following table demonstrates the effectiveness of blends in a diesel engine as described in Table 3.

Table 9

| | BMEP (p.s.i.) | BSFC (lbs./B.H.P. hrs.) |
|---|---|---|
| Vol. Percent 25 parts Propane and 75 parts Butane: | | |
| 0 | 70 | .476 |
| 20 | 72 | .474 |
| 24 | 73 | .475 |
| Vol. Percent 75 parts Propane and 25 parts Butane: | | |
| 18 | 73 | .475 |
| 22 | 72 | .474 |

The above examples demonstrate that diesel fuels prepared in accordance with the present invention will be superior to ordinary diesel fuels. Those percentage values having an asterisk before them are amounts which are insufficient to raise the phase envelope in accordance with the invention and, as can be seen, do not increase the efficiency of the engine.

It is well recognized that butane and particularly propane are rather volatile substances and as such, particularly in the higher concentrations, can form vapor locks in the fuel supply system. This problem can be easily overcome by anyone skilled in the art by simple mechanical means as, for example, cooling the fuel supply system. A propane blend of 8 volume percent in a diesel fuel oil can be stored under a pressure of about 30 p.s.i. however, a 10 volume percent blend of butane can be stored without additional pressure as its vapor pressure is about that of ordinary gasoline.

In order to obtain higher horsepower diesel engines, the trend has been toward higher compression ratios with the accompanying disadvantages of heavier, bulkier engines to withstand these high internal pressures. My invention helps solve this problem in obtaining increased fuel efficiency with corresponding higher horsepower in engines of lower compression pressures.

In view of the fact that butane is more easily stored and is available in quantity, it is preferred, and since up to 15 percent of butane in diesel fuel can be handled in about the same manner as ordinary gasoline and at these percentages is extremely useful in raising the efficiency of lower and medium compression pressure diesel engines, I prefer from about 8 to 15 percent by volume of butane or a liquefied hydrocarbon gas rich in butane in a diesel fuel.

Obviously, many modifications and variations of the invention, as hereinbefore set forth, may be made without departing from the spirit and scope thereof, and, therefore, only such limitations should be imposed as are indicated in the appended claims.

I claim:

1. A fuel for a compression ignition engine consisting essentially of a diesel hydrocarbon stock and butane in an amount to raise the critical pressure of the mixture to at least the compression pressure of the engine.

2. The fuel of claim 1 wherein the amount of butane ranges from 8 to 15 percent by volume of the total fuel.

References Cited in the file of this patent

UNITED STATES PATENTS

| 1,398,948 | Schreiber | June 25, 1918 |
| 2,028,308 | Wilke et al. | Jan. 21, 1936 |